United States Patent [19]

Johnson et al.

[11] Patent Number: 4,731,188
[45] Date of Patent: Mar. 15, 1988

[54] ADJUSTABLE RAMP FOR DEWATERING DEVICE

[75] Inventors: Harold W. Johnson, Kingwood; Thomas R. McClughan; Joseph V. Zapata, both of Houston, all of Tex.

[73] Assignee: Ashbrook-Simon-Hartley, Houston, Tex.

[21] Appl. No.: 847,774

[22] Filed: Apr. 3, 1986

[51] Int. Cl.⁴ ............................................. B01D 33/04
[52] U.S. Cl. ..................................... 210/783; 210/791; 210/237; 210/396; 210/400
[58] Field of Search ....................... 210/783, 791, 96.1, 210/109, 112, 232, 237, 238, 239, 241, 396, 400, 401, 143, 388; 209/272, 307, 308, 385, 413, 267, 263, 264, 266, 379

[56] References Cited

U.S. PATENT DOCUMENTS 2,457,018 12/1948 Wantling .............................. 209/267
3,984,329 10/1976 Wenzel et al. ....................... 210/396

FOREIGN PATENT DOCUMENTS

377744 4/1985 Fed. Rep. of Germany .
55-5737 1/1980 Japan ................................... 210/401
1181968 2/1970 United Kingdom .
2068761 4/1984 United Kingdom .

Primary Examiner—David Sadowski
Assistant Examiner—Linda S. Evans
Attorney, Agent, or Firm—Schwartz, Jeffery, Schwaab, Mack, Blumenthal & Evans

[57] ABSTRACT

A dewatering method and apparatus is disclosed which uses a ramp at one end of a perforate conveyor in which the incline of the ramp may be adjusted while the dewatering operation is taking place. The ramp receives material to be further dewatered after the material has moved along the length of the perforate conveyor. The ramp causes the material to roll back upon itself as the material tends to move up the ramp, which rolling back action enhances dewatering. An actuator is coupled with said ramp for effecting movement of said ramp with respect to the conveyor to adjust the incline of the ramp with respect to the upper surface of the conveyor. In this way, the operator may readily optimize the rolling back action of the material to be dewatered to, in turn, thereby provide optimum dewatering. The ramp is also capable of being completely lifted out of the flow of material to be dewatered while the apparatus is in operation and while the dewatering process is being carried out.

29 Claims, 6 Drawing Figures

ADJUSTABLE RAMP FOR DEWATERING DEVICE

FIELD OF THE INVENTION

The present invention relates to dewatering equipment using a perforate conveyor belt, i.e., a filter belt, through which water may be drained by gravity. Such dewatering devices may be used for dewatering and thickening of sludge. More particularly, the present invention relates to dewatering equipment utilizing a ramp disposed at an incline with respect to the conveyor, which conveyor ramp is located adjacent the downstream end of the perforate conveyor belt to enhance dewatering.

BACKGROUND OF THE INVENTION

It is known to use a perforate endless conveyor belt for the dewatering and thickening of sludge. Sludge to be dewatered is treated with a polymer to effect flocculation of the solid material in the sludge, which flocculation permits separation of the water from the sludge. The flocculated sludge and water are deposited on the upper surface of a perforate conveyor belt. As the flocculated sludge and water travel along the belt, water drains through perforations in the belt by the action of gravity to dewater and thicken the sludge. Flow breakers of the type shown in U. S. Pat. 3,984,329 to Wenzel et al, which patent is hereby incorporated herein by reference, may be interposed in the path of the sludge being dewatered to plow furrows in the sludge and enhance the drainage of water from the flocculated, colloidal sludge.

Copending U.S. patent application Ser. No. 703,594 filed Feb. 20, 1985 by Austin et al, which is a continuation of now-abandoned U.S. patent application Ser. No. 513,438 filed July 13, 1983, which applications are hereby incorporated herein by reference, disclose an improvement in dewatering devices of this general type. The improved dewatering device includes a ramp adjacent the output end of the perforate conveyor belt, which ramp causes the dewatered sludge to ascend the ramp. The ramp extends substantially across the width of the conveying surface and is set at a sufficient height and angle as to create an optimum backward rolling action of the sludge. This, in turn, imparts to the particles of the sludge a shearing action which further relieves trapped water from between the particles to enhance dewatering.

It has been discovered that the optimum angle of inclination for the ramp with respect to the conveyor is not the same for all sludges. Indeed, even at the same treatment plant, characteristics of the sludge may vary over the course of a day. Such characteristics tend to be particularly variable at different seasons.

Some waste activated sludges are characterized by a very delicate floc or colloidal structure created by the polymer, which floc can be broken up if the sludge is subjected to too much agitation or disturbance. Breaking up of the floc, in turn, causes clogging of the drainage passageways through the perforate belt. This, in turn, greatly diminishes or destroys the dewatering capabilities of the belt filter dewatering device. The performance can only be restored by interrupting the dewatering process and cleaning the clogged belt. For delicate sludges of this type, optimum dewatering is achieved with a relatively small angle of incline of the ramp with respect to the belt which, in turn, effects a less robust rolling back action of the sludge upon itself as the sludge tends to move up the ramp. This, in turn, results in a more gentle rolling and shearing action so as not to destroy the floc and so as to avoid clogging of the belt.

In other, less delicate, yet watery, sludges, a relatively low angle of incline will result in less than optimum production of solids by the dewatering device. Such sludges are better handled by a ramp with a steeper incline, which produces a more vigorous rolling back action.

Sludges which already have a low water content when they reach the ramp are better handled with a lower angle of incline and a less rolling back action.

SUMMARY OF THE INVENTION

In view of these considerations, it is an object of the present invention to provide a method and apparatus for dewatering a material, such as sludge, which method and apparatus can provide enhanced dewatering for a variety of sludges or other materials having different characteristics.

It is a further object of the present invention to provide a dewatering method and apparatus utilizing a ramp at one end of a perforate belt conveyor to enhance dewatering, in which method and apparatus the incline of the ramp may be quickly and easily adjusted.

It is another object of the present invention to provide a dewatering method and apparatus using a ramp at one end of a perforate conveyor in which the incline of the ramp may be adjusted while the dewatering operation is taking place, i.e., in which the incline of the ramp may be adjusted during operation.

It is also an object of the present invention to provide a dewatering method and apparatus utilizing a ramp adjacent one end of a perforate conveyor in which the ramp may be easily and quickly lifted completely out of the path of the material to be dewatered.

It is a related object of the invention to provide a dewatering method and apparatus utilizing a ramp adjacent one end of a perforate conveyor in which the ramp is capable of being completely lifted out of the flow of material to be dewatered while the apparatus is in operation and while the dewatering process is being carried out.

It is yet another object of the present invention to provide a dewatering method and apparatus utilizing a perforate conveyor and a ramp adjacent one end of the conveyor in which a human operator may adjust the incline of the ramp and/or lift the ramp completely from the flow of material to be dewatered while the apparatus is operating and the dewatering process is being carried out without the need for using any tools and by effecting such adjustment or complete lifting of the ramp from one side of the machine.

It is also an object of the invention to provide a dewatering method and apparatus which achieve the foregoing objects using a method and construction which is simple and economical, which involves hardware which is economical and easy to make, which is easy to use, and which is simple in function and operation.

It is a further object of the present invention to provide a dewatering method and apparatus which achieves the foregoing objects through a device which is easily retrofitted as an attachment to existing belt filter dewatering devices.

These and other objects and advantages of the present invention will become more apparent from the description which follows and from the drawing.

To achieve the foregoing objects, the present invention provides an apparatus for use with a dewatering device of the type having a frame which carries a perforate conveyor, which conveyor has upstream and downstream ends. The conveyor also has an upper surface on which material being dewatered is deposited and through which conveyor water is drained. The method and apparatus of the present invention is for enhancing the performance of such a dewatering device, which includes a ramp adjacent the downstream end of the conveyor and disposed at an incline with respect to the upper surface of the conveyor. The ramp receives the material being dewatered and causes the material to roll back upon itself as the material tends to move up the ramp but partially falls back as a result of the incline. This rolling back action enhances dewatering. The ramp is coupled with the frame for movement with respect thereto and with respect to the upper surface of the conveyor. An actuator is coupled with the ramp for effecting movement of the ramp with respect to the frame and with respect to the upper surface of the conveyor to adjust the incline of the ramp to optimize the rolling back action of the sludge or other material to be dewatered and to in turn, thereby provide optimum dewatering.

A ramp support supports the ramp with respect to the conveyor and allows the adjustment of the incline of the ramp with respect to the upper surface of the conveyor. The ramp support includes a shaft extending across the conveyor at a level above the material being dewatered. This shaft has an axis transverse to the direction in which material being dewatered moves across the conveyor.

A plurality of support arms extend between the shaft and the ramp. Each support arm has an upper end adjacent to which upper end the support arm is affixed to the shaft. Each support arm also has a lower end adjacent to which lower end the support arm is affixed to the ramp.

The ramp support also includes a pair of support members disposed outwardly of the support arms, each support member having an upper and lower end. Each support member is affixed near its upper end to the shaft.

Further, the ramp support includes a pair of stationary mounting members coupled with the frame of the dewatering device. The lower ends of the support members are pivotably coupled with the mounting members at a main pivot axis. Pivotal movement of the support members with respect to the mounting members effects movement of the upper ends of the support members along arcuate paths, which movement, in turn, effects movement of the shaft, generally transversely to its axis, along the same arcuate path. This arcuate movement of the shaft is translated, via the support arms, into angular movement of the ramp to adjust the incline of the ramp with respect to the conveyor. The actuator initiates this movement, which actuator is operatively coupled between one of the stationary mounting members and one of the support members. Actuation of the actuator moves the support member with respect to the mounting member to effect the adjustment of the incline of the ramp.

The apparatus of the invention also includes an arrangement for completely lifting the ramp out of the path of the sludge or other material being dewatered during operation of the dewatering device. The lifting arrangement includes a movable lifting handle having an upper end and a lower end, the lifting handle being affixed adjacent its upper end with respect to the shaft. Movement of the lifting handle effects rotation of at least part of the shaft about its axis which, in turn, swings the entirety of the ramp, via the support arms, away from the conveyor and out of the path of the material being dewatered.

The dewatering process of the present invention entails depositing sludge onto a moving perforate conveyor having an upper surface and advancing the sludge along the conveyor while water drains from the sludge through the perforate conveyor. The ramp, which of course is inclined with respect to the upper surface of the conveyor, is interposed into the path of the moving sludge so as to cause the sludge to roll back upon itself as the sludge tends to move up the ramp but partially falls back as a result of the incline, this rolling back action enhancing dewatering. The method of the invention includes the step of adjusting the incline of the ramp with respect to the upper surface of the conveyor while the sludge is advancing on the conveyor, which adjusting step optimizes dewatering. Further, according to the present invention, the ramp may be completely lifted out of the path of the advancing sludge while the dewatering device is operating. This complete removal of the ramp from the path of the sludge during operation allows for cleaning of the dewatering device and also permits easy accommodation of situations in which the enhanced dewatering provided by the ramp is not needed.

DETAILED DESCRIPTION OF THE PREFERRED EMBODIMENT

In the following description and in the drawings, like reference numerals used among the various figures of the drawings refer to like elements or features.

Figure 3:
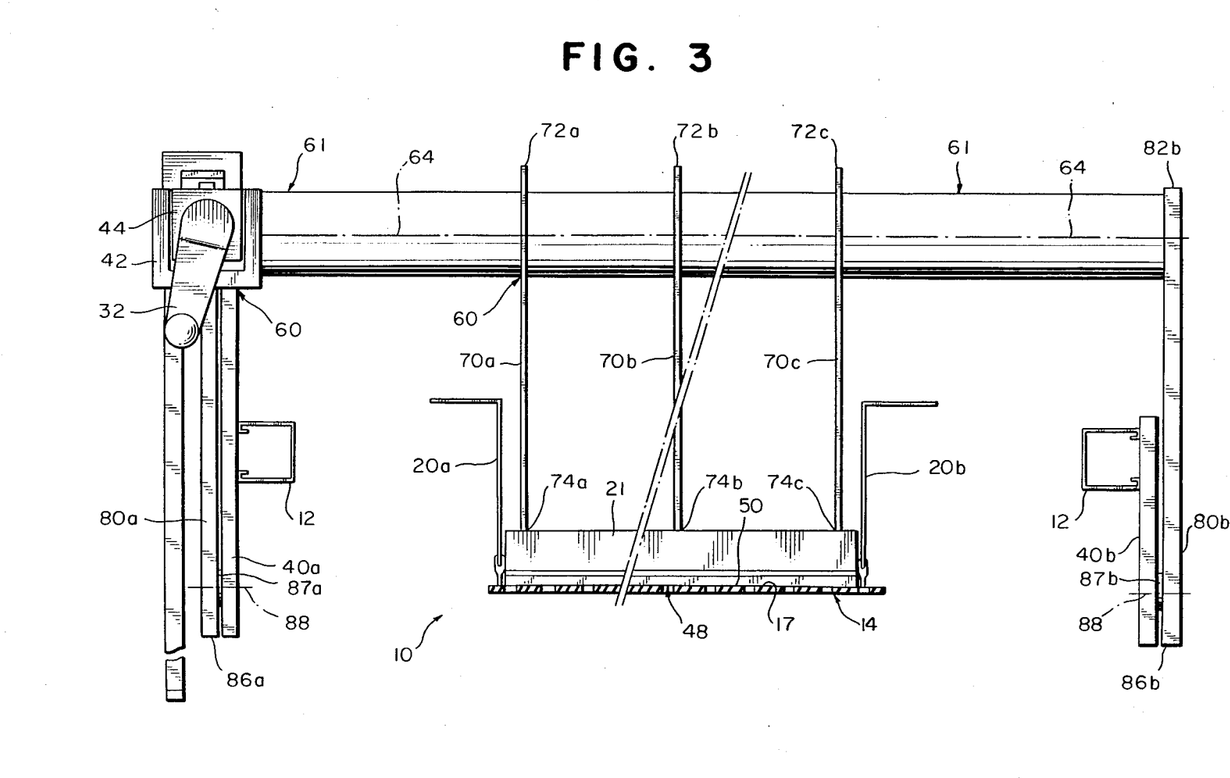
FIG. 3 is a partial, fragmentary end view of the apparatus providing the adjustable ramp as well as part of the dewatering device, which end view is taken from the vantage of line A—A of FIG. 2.

Reference numeral 10 generally designates a dewatering device having a frame 12 and a perforate conveyor 14 carried by the frame. Perforate conveyor 14 has an upstream end 15, a downstream end 16, and an upper surface 17 on which sludge 18 or other material to be dewatered is carried. Specifically, sludge 18, which has been treated with polymer or another substance to cause flocculation of the solid materials in the sludge, is deposited on upper surface 17 of the conveyor adjacent upstream end 15. As the sludge travels toward the downstream end 16 of conveyor 14, water drains through the perforations in conveyor 14 as shown by arrows 19 in FIG. 1. As the sludge travels along conveyor 14, it is held on the conveyor and restrained from lateral overflow by side walls 20a 20b as best seen in FIG. 3.

A ramp 21 is located adjacent the downstream end of conveyor 14 and disposed at an incline with respect to upper surface 17 of the conveyor. The ramp receives sludge 18 and causes the sludge to roll back upon itself. Specifically, the sludge tends to move up the ramp, yet partially falls back down the incline of the ramp as a result of the gravitational resistance introduced by the ramp, which rolling back action enhances dewatering. The rolling back action is shown by arrow 22 in FIG. 1, and the increased dewatering caused by shear in the sludge induced from the rolling back action is shown by arrows 24 in FIG. 1.

Ramp 21 is indirectly coupled with the stationary frame 12 of the dewatering device and is movable with respect thereto and with respect to upper surface 17 of the conveyor 14. Such relative movement of the ramp is initiated by an actuator 30 indirectly coupled with ramp 21 to set the angle of incline to optimize the rolling back action of the material to be dewatered and to, in turn, thereby provide optimum dewatering.

Actuator 30 is disposed at a place above and spaced from the sludge 18 on the conveyor 14. Actuator 30 includes a manual crank 32 for effecting telescoping movement. Through mechanisms to be described further, actuator 30 effects movement of ramp 21 to adjust the incline of the ramp with respect to the upper surface 17 of conveyor 14. Actuator 30 includes a cylinder 34 which has internal helical screw threads. Cylinder 34 cooperates in telescoping, mating relationship with shaft 36, this shaft having external screw threads. Rotation of cylinder 34 via manual crank 32 feeds shaft 36 into or out of cylinder 34 to provide the telescoping movement of actuator 30.

Figure 6:
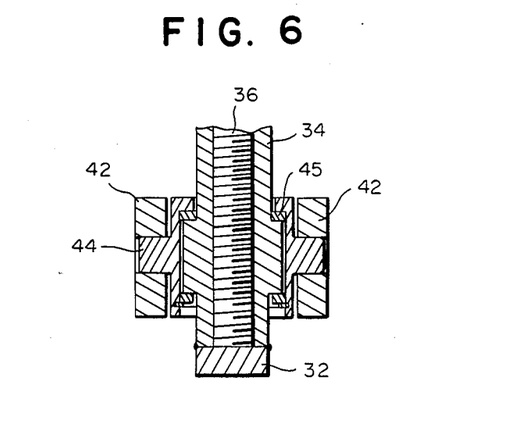
FIG. 6 is an enlarged fragmentary detailed sectional view taken on the line D—D of FIG. 2.

A pair of mounting members 40a, 40b are disposed on both lateral sides of conveyor 14. Mounting members 40a, 40b are anchored to frame 12 of dewatering device 10. Cylinder 34 of actuator 30 is mounted on mounting member 40a via bracket 42. (See particularly FIGS. 2, 3 and 6.) Bracket 42 has a journal block 44 disposed therein, which journal block 44 may rock with respect to an axis perpendicular to the direction of sludge flow to accommodate angular movement of actuator 30 in response to angular movements of the mechanism which effects adjustment of the incline of ramp 21. Journal block 44 also includes an inner bearing 45 which permits cylinder 34 to rotate with respect to journal block 44 about an axis generally parallel to the direction of sludge flow to accommodate the screw-type telescoping movement of actuator 30.

Figure 2:
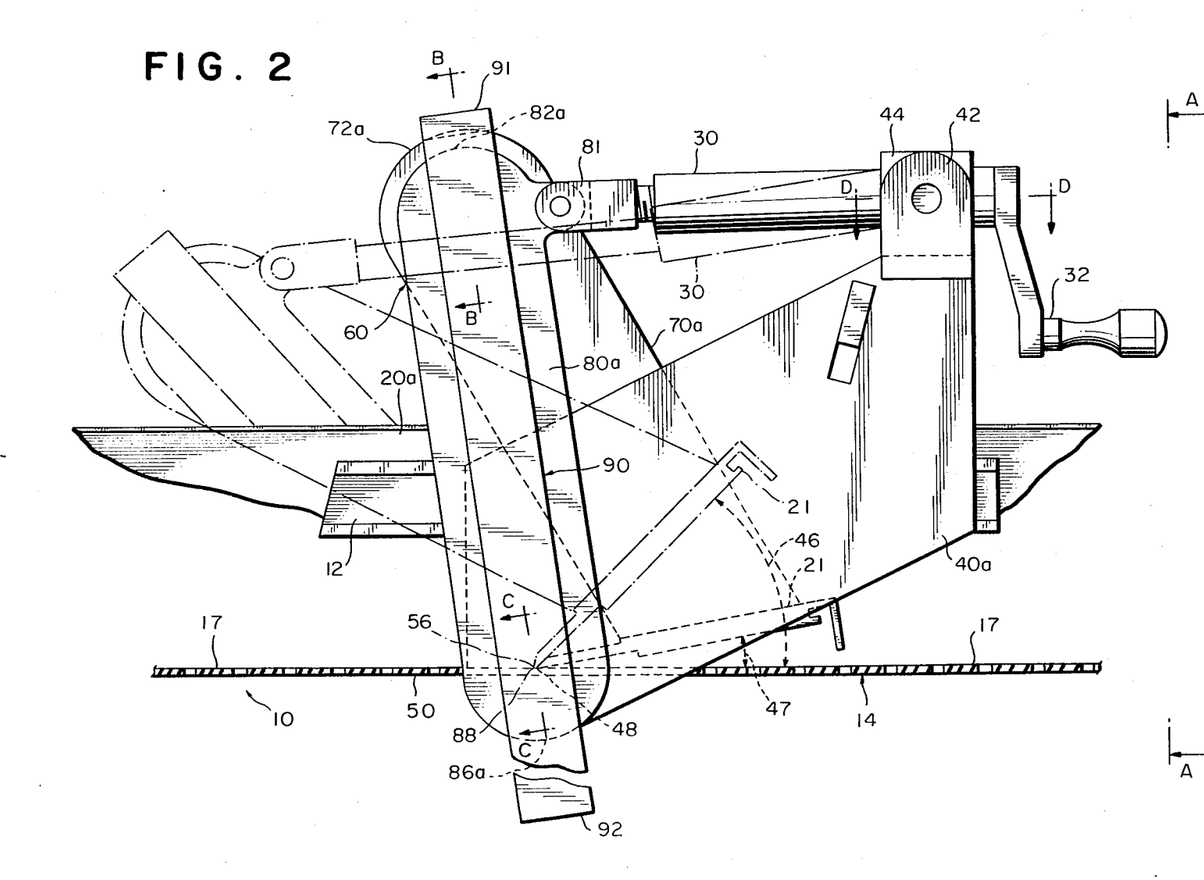
FIG. 2 is an enlarged fragmentary, detailed view of that equipment in FIG. 1 which provides the adjustable ramp.

FIG. 2 depicts ramp 21 adjusted to both a minimum angle 47 of 10° with respect to upper surface 17 of conveyor 14 and a maximum angle 46 of 45° with respect to upper surface 17 of conveyor 14. The adjustment to the minimum angle 47 for both the ramp 21 itself and the associated adjusting mechanism is shown in broken dash lines in FIG. 2. The adjustment to the maximum angle 46 is shown in phantom lines which include a dash followed by a pair of dots. Ramp 21 may be adjusted to any angle of inclination falling between maximum angle 46 and minimum angle 47. Movement between any of these various possible incline positions is initiated by actuator 30.

Regardless of the extent of angular incline chosen for ramp 21, ramp 21 registers with upper surface 17 of conveyor 14, preferably by contacting upper surface 17 at a particular location of registry 48. Location of registry 48 remains in the same place throughout all angular inclines between the maximum and minimum angles 46, 47 as illustrated in FIG. 2.

Conveyor 14 preferably takes the form of an endless perforate belt 50 carried by an upstream roller 52 and a downstream roller 54, about which rollers 52, 54 the endless perforate belt 50 passes. Downstream roller 54 has an uppermost apex 56, which apex 56 is at the location which the belt 50 first contacts as it engages the downstream roller 54. Ramp 21 has a lower edge 58 which registers with belt 50 at the location of registry 48. This location of registry 48 is disposed immediately forward of apex 56 of downstream roller 54.

Movement of ramp 21 so as to change its incline to optimize dewatering for particular sludge characteristics is initiated by actuator 30 and carried out by a ramp support mechanism 60, which ramp support mechanism 60 also partially provides the capability to completely pivotably lift the entire ramp from the path of the sludge flow.

Ramp support mechanism 60 includes a shaft 61 extending across conveyor 14 at a level above the level of the sludge 18. Shaft 61 has an inner part 62 and an outer part 63 surrounding the inner part. The composite shaft has an axis 64 which is transverse to the direction of sludge flow as shown by arrow 66 in FIG. 1. That is, axis 64 is transverse to the direction 66 in which sludge 18 being dewatered moves along conveyor 14.

Ramp support mechanism 60 also includes a plurality of support arms, specifically three support arms 70a, 70b, 70c extending between shaft 61 and ramp 21. Support arms 70a, 70b, 70c include upper ends 72a, 72b, 72c, respectively. Each such upper end is affixed to shaft 61 and, in particular, is affixed to outer part 63 of shaft 61. Support arms 70a, 70b, 70c also have lower ends 74a, 74b, 74c, respectively. Adjacent to each such lower end, each support arm 70a 70b, 70c is affixed to ramp 21.

Ramp support mechanism 60 also includes a pair of support members 80a, 80b disposed laterally about conveyor 14 and laterally outwardly of support arms 70a, 70b, 70c. Actuator 30 is coupled with support member 80a by clevis 81. Support members 80a, 80b are affixed near their upper ends 82a, 82b, respectively, by fasteners 84 (FIG. 4) to inner part 62 of shaft 61. A bushing 85 is disposed between inner part 62 and outer part 63 of shaft 61 so that parts 62, 63 are capable of relative angular movement. Such relative angular movement will occur when the ramp 21 is completely lifted from the sludge 18, as will be described later. That is, when ramp 21 is completely lifted from sludge 18 as a result of rotation of outer part 63, the inner part 62 of shaft 61 is held stationary by support members 80a, 80b.

Figure 5:
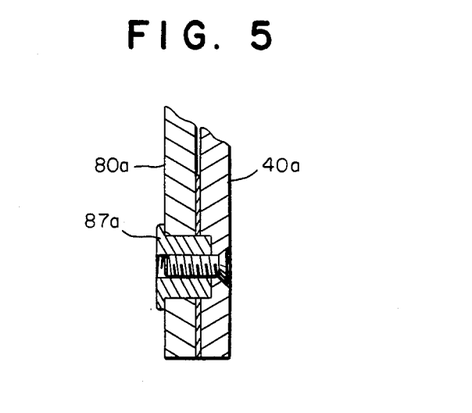
FIG. 5 is an enlarged fragmentary detailed sectional view taken on the line C—C of FIG. 2.

Support members 80a, 80b have lower ends 86a, 86b. Support members 80a, 80b are pivotably coupled adjacent their lower ends 86a, 86b with mounting members 40a, 40b, respectively, at journals 87a, 87b, respectively (FIG. 5), to provide a main pivot axis 88. Main pivot axis 88 corresponds with location of registry 48 and lower edge 58 of ramp 21. Main pivot axis 88 is the axis about which ramp 21 rotates when it is adjusted from one angle of inclination to another.

With the foregoing construction, pivotal movement of support members 80a, 80b with respect to mounting members 40a, 40b respectively, which pivotal movement is initiated by actuator 30, effects movement of the upper ends 82a, 82b of support members 80a, 80b along an arcuate path, as will be apparent from FIG. 2. This arcuate movement, in turn, effects movement of shaft 61, generally transverse to its axis, along the same arcuate path, such arcuate movement of shaft 61 being translated via support arms 70a, 70b, 70c into angular movement of ramp 21 to adjust the incline of the ramp respect to the conveyor.

It will be apparent that this adjustment in the incline of ramp 21 may be made while the dewatering device 10 is operating and while the dewatering process is being carried out. In other words, it is not necessary to stop the machine, reach into the sludge and/or use tools to effect a change in the angle of inclination of the ramp 21. The human operator overseeing the equipment is able to perform the adjustment from one side of the machine during operation without using any tools.

Figure 1:
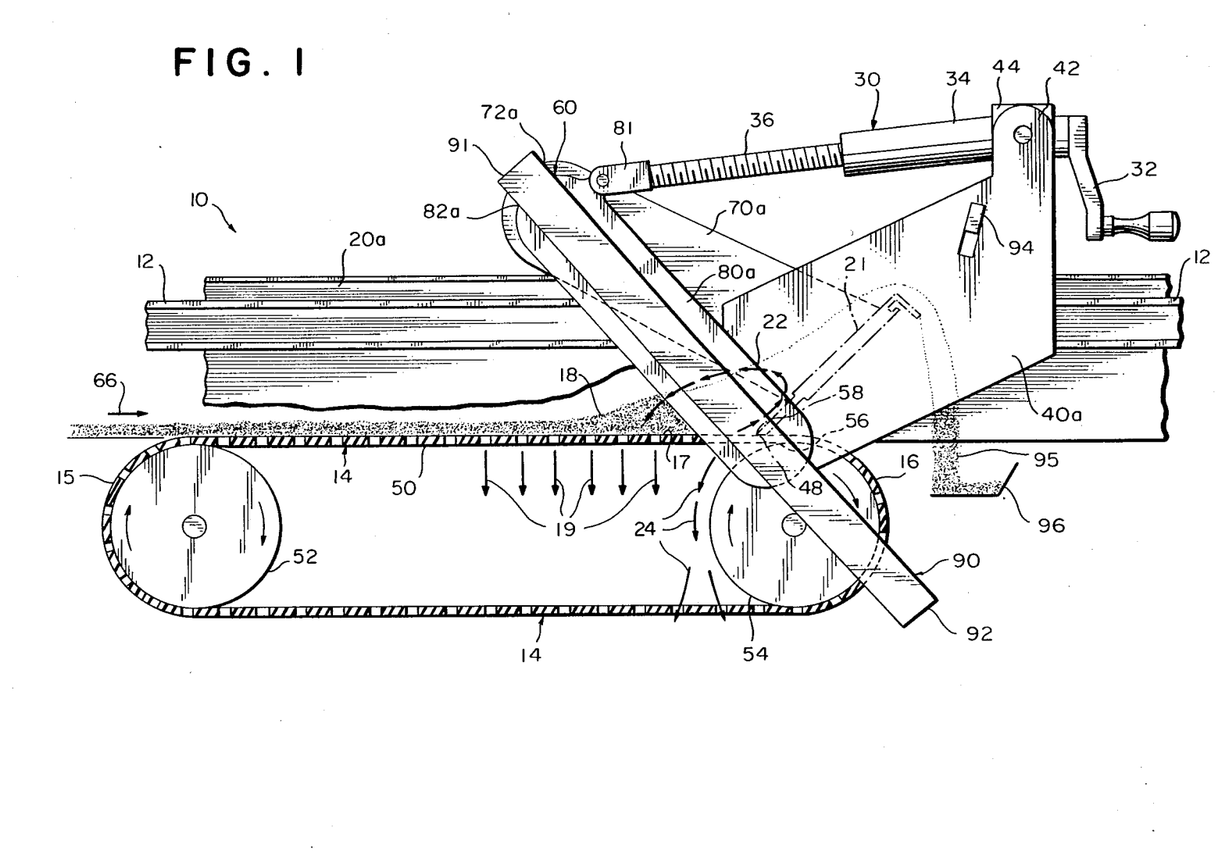
FIG. 1 is a side elevational view of a dewatering device according to the present invention, certain parts being cut away for purposes of illustration, the dewatering device including an apparatus which utilizes an adjustable ramp to enhance dewatering, such apparatus being shown in oversized form with respect to the remainder of the dewatering device for purposes of illustrating the invention.

The adjustment of the ramp is used to aid in the dewatering and thickening of sludges in belt filter devices and gravity belt thickeners 10. By adjusting the angle of inclination of the ramp 21, the height of the sludge 18 in the gravity zone, i.e., in the area above the belt 50, changes. In addition to changing the height of the sludge, the amount of rolling back action as depicted by arrow 22 in FIG. 1 is increased as the angle is increased.

These adjustments in the angle of inclination are, as indicated, performed while the dewatering device 10 is operating. The human operator simply turns the manual crank 32 of the actuator 30 while observing the condition of the thickened sludge. An angle of inclination will be selected which results in the maximum thickening of the sludge. As described previously, a shallow angle of inclination approaching minimum angle 46 achieves maximum thickening in a delicate sludge subject to floc destruction if a higher angle of inclination were to be used. Conversely, for a wet sludge in which the floc is not as delicate, maximum dewatering may be achieved at an angle of inclination approaching the maximum angle 47. The operator sets the angle of inclination according to observation.

Figure 4:
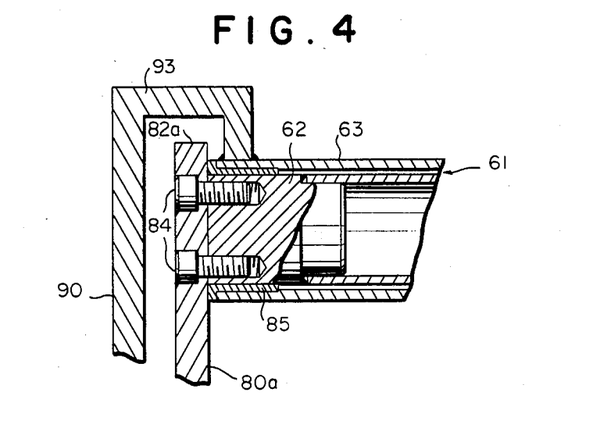
FIG. 4 is an enlarged fragmentary detailed sectional view taken on the line B—B of FIG. 2.

The apparatus of the present invention, which provides a ramp and a mechanism for adjusting the inclination of the ramp during operation, also includes a mechanism capable of completely lifting the ramp 21 out of the path 66 of the sludge 18 during operation. This lifting mechanism includes a movable lifting handle 90 having an upper end 91 and a lower end 92. Lifting handle 90 is affixed adjacent its upper end 91 to shaft 61 by a bridge 93 as best seen in FIG. 4. Lifting handle 90 is, in particular, affixed to outer part 63 of shaft 61 by welding, such that movement of lifting handle 90 effects rotation of outer part 63 of shaft 61 without also rotating inner part 62 of shaft 61, which is restrained against rotation by support member 80a. When outer part 63 of shaft 61 is rotated about its axis by lifting handle 90, the entirety of ramp 21 is then swung via support arms 70a, 70b, 70c away from conveyor 14 and out of the path 66 of sludge 14 being dewatered.

As indicated, this lifting operation may take place during the dewatering process and during operation of the dewatering device 10. This is desirable for cleaning the dewatering device or for accommodating situations in which the enhanced dewatering provided by the ramp 21 is not needed. A locking mechanism 94 is disposed on mounting member 40a. Locking mechanism 94 selectively engages lifting handle 90 to hold the lifting handle in a position which, in turn, holds the ramp in a raised position out of the path of material to be dewatered when so desired.

It will be apparent that the process of the invention entails the steps of depositing sludge 18 on the moving perforate conveyor 14, specifically the upper surface 17 thereof, and advancing the sludge 18 along the conveyor 14 while water drains from the sludge as shown by arrows 19. The method also includes interposing a ramp, which is inclined with respect to the upper surface 17 of the conveyor, into the path 66 of the moving sludge 14 so as to cause the sludge to roll back upon itself as the sludge tends to move up the ramp but partially falls back as a result of the incline, which rolling back action enhances dewatering. Further, the method of the invention includes adjusting the incline of the ramp 21 with respect to upper surface 17 of the conveyor 14 while the sludge 18 is advancing on the conveyor in order to optimize dewatering. According to the method of the present invention, the ramp 21 may be completely lifted out of the path 66 of the advancing sludge 14 while the dewatering device 10 is operating.

While certain of the sludge rolls back upon itself after moving partially up the ramp 21, as described, it will be apparent that certain of the sludge is able to advance up the entire grade provided by ramp 21 and is discharged from downstream end 16 of the dewatering device 10. Of course, this discharged sludge 95 (FIG. 1) has a higher solids content, i.e., less water, than if it were discharged without the use of the inclined ramp 21. The discharged sludge 95 is directed to a receiving vessel 96 schematically shown in FIG. 1.

It will be apparent that the apparatus of the present invention—which includes the ramp and the associated mechanism which adjustably supports and moves the ramp and which provides for complete lifting of the ramp 21 from the sludge 18—may be a separate unit from the dewatering device. This separate unit is capable of being attached to an existing dewatering device 10 as a retrofit to enhance the performance of the dewatering device.

While the present invention has been described in connection with a certain preferred embodiment, it will be understood that the invention embraces other embodiments, variations and modifications to the device as shown, all within the spirit and scope of the appended claims.

What is claimed is:

1. A dewatering device comprising:
   (a) a frame;
   (b) a perforate conveyor carried by said frame, said conveyor having upstream and downstream ends and having an upper surface on which material being dewatered is deposited and through which conveyor water is drained;
   (c) a ramp adjacent said downstream end of said conveyor and disposed at an incline with respect to said upper surface of said conveyor, said ramp receiving the material being dewatered and causing the material to roll back upon itself as the material tends to move up the ramp but partially falls back as a result of the incline, which rolling back action enhances dewatering, said ramp being coupled with said frame for movement with respect thereto and with respect to said upper surface of said conveyor; and (d) an actuator coupled with said ramp for effecting movement of said ramp with respect to said frame and with respect to said upper surface of said conveyor to adjust the incline of the ramp with respect to said upper surface of said conveyor to optimize the rolling back action of the material to be dewatered and to, in turn, thereby provide optimum dewatering.

2. A dewatering device as defined in claim 1, wherein said actuator is manually operated and is disposed at a place spaced from the material being dewatered on said conveyor.

3. A dewatering device as defined in claim 2, wherein said actuator includes a manual crank, the turning of which effects movement of said ramp to adjust the incline of the ramp with respect to said upper surface of said conveyor 4. A dewatering device as defined in claim 1, wherein said ramp is coupled to said frame for movement between angles of 10° and 45° relative to said upper surface of said conveyor.

5. A dewatering device as defined in claim 1, wherein said ramp registers with said upper surface of said conveyor at a particular location, which location remains the same regardless of the angle of inclination at which said ramp is set.

6. A dewatering device as defined in claim 1, wherein said conveyor includes an endless perforate belt and a roller at said downstream end of said conveyor and about which roller the endless perforate belt passes, said roller having an uppermost apex, and wherein said belt, when it moves from said upstream end to said downstream end of said conveyor, first contacts said roller at said apex, said ramp having a lower edge which registers with said belt at a location of registry, said location of registry being immediately forward of said apex of said roller.

7. A dewatering device as defined in claim 1 including a ramp support for supporting said ramp with respect to said frame, said ramp support including:

(a) a shaft extending across the conveyor at a level above the material being dewatered, said shaft having an axis transverse to the direction in which material being dewatered moves along said conveyor;

(b) at least one support arm extending between said shaft and ramp, said support arm having an upper end adjacent to which said support arm is affixed to said shaft, said support arm also having a lower end adjacent to which said support arm is affixed to said ramp;

(c) at least one support member having upper and lower ends, said support member being affixed near its upper end to said shaft; and (d) a stationary mounting member coupled with said frame, said lower end of said support member being pivotably coupled with said mounting member at a main pivot axis, whereby pivotal movement of said support member with respect to said mounting member effects movement of said upper end of said support member along an arcuate path which movement, in turn, effects movement of said shaft, generally transversely to its axis, along the same arcuate path, such movement of said shaft being translated, via said support arm, into angular movement of said ramp to adjust the incline of said ramp with respect to said conveyor.

8. A dewatering device as defined in claim 7, wherein said actuator is operatively coupled between said stationary mounting member and said support member, whereby actuation of said actuator moves said support member with respect to said mounting member to adjust the incline of said ramp with respect to said upper surface of said conveyor.

9. A dewatering device as defined in claim 7 further including a movable lifting handle having an upper end and a lower end, said lifting handle being affixed adjacent its upper end with respect to said shaft such that movement of said lifting handle effects rotation of at least part of said shaft about its axis which, in turn, swings the entirety of said ramp via said support arm, away from said conveyor and out of the path of material being dewatered.

10. A dewatering device as defined in claim 9 further including a locking mechanism on said mounting member, said locking mechanism being selectively engageable with said lifting handle to hold said lifting handle in a position which, in turn, holds said ramp in a raised position out of the path of the material to be dewatered.

11. A dewatering device comprising:

(a) a frame;

(b) a perforate conveyor having upstream and downstream ends and having an upper surface on which material being dewatered is deposited and through which conveyor water is drained as the material being dewatered moves downstream along said conveyor;

(c) a ramp adjacent said downstream end of said conveyor and disposed at an incline with respect to said upper surface of said conveyor, said ramp receiving the material being dewatered and causing the material to roll back upon itself as the moving material tends to move up the ramp but partially falls back as a result of the incline, which rolling back action enhances dewatering; and (d) means coupled with said ramp for completely lifting said ramp out of the path of the mateiral being dewatered during operation of the dewatering device, said ramp being supported by said frame.

12. A dewatering device as defined in claim 11, wherein said lifting means includes a ramp support for supporting said ramp with respect to said frame, said ramp support including:

(a) a shaft extending across the conveyor at a level above the material being dewatered, said shaft having an axis transverse to the direction in which material being dewatered moves along said conveyor;

(b) at least one support arm extending between said shaft and said ramp, said support arm having an upper end adjacent to which said support arm is affixed to said shaft, said support arm also having a lower end adjacent to which said support arm is affixed to said ramp;

(c) at least one support member having upper and lower ends, said support member being affixed near its upper end to said shaft; and (d) a movable lifting handle having an upper end and a lower end, said lifting handle being affixed adjacent its upper end with respect to said shaft such that movement of said lifting handle effects rotation of at least part of said shaft about its axis which, in turn, swings the entirety of said ramp via said support arm, away from said conveyor and out of the path of material being dewatered.

13. A dewatering device as defined in claim 11 further including means coupled with said ramp for adjusting the incline of said ramp with respect to said upper surface of said conveyor to optimize the rolling back action of the material being dewatered and to, in turn, provide optimum dewatering.

14. An apparatus for use wiht a dewatering device of the type having a frame which carries a perforate conveyor with upstream and downstream ends, the conveyor also having an upper surface on which material being dewatered is deposited and through which conveyor wwater is drained, which apparatus is for enhancing the performance of the dewatering device, the apparatus for use with the dewatering device comprising:
  (a) a ramp for disposition adjacent said downstream end of said conveyor and for disposition at an incline with respect to the upper surface of the conveyor, said ramp receiving the material being dewatered and causing the material to roll back upon itself as the material tends to move up the ramp but partially falls back as a result of the incline, which rolling back action enhances dewatering, said ramp being for coupling with the frame for movement with respect thereto and with respect to said upper surface of said conveyor; and
  (b) an actuator coupled with said ramp for effecting movement of said ramp with respect to the frame and with respect to said upper surface of the conveyor to adjust the incline of said ramp with respect to said upper surface of said conveyor to optimize the rolling back action of the material to be dewatered and to, in turn, thereby provide optimum dewatering.

15. An apparatus as defined in claim 14, wherein said actuator is manually operated and is disposed at a place spaced from the material being dewatered on the conveyor.

16. An apparatus as defined in claim 15, wherein said actuator includes a manual crank, the turning of which effects movement of said ramp to adjust the incline of the ramp with respect to the upper surface of the conveyor.

17. An apparatus as defined in claim 14, wherein the conveyor includes an endless perforate belt and a roller at the downstream end of the conveyor and about which roller the endless perforate belt passes, the roller having an uppermost apex, and wherein the belt, when it moves from the upstream end to said downstream end of such conveyor, first contacts the roller at the apex, the ramp having a lower edge which registers with the belt at a location of registry, the location of registry being immediately forward of said apex of the roller.

18. An apparatus as defined in claim 14 including a ramp support for supporting said ramp with respect to the frame, said ramp support including:
  (a) a shaft extending across the conveyor at a level above the material being dewatered, said shaft having an axis transverse to the direction in which material being dewatered moves along the conveyor;
  (b) at least one support arm extending between said shaft and ramp, said support arm having an upper end adjacent to which said support arm is affixed to said shaft, said support arm also having a lower end adjacent to which said support arm is affixed to said ramp;
  (c) at least one support member having upper and lower ends, said support member being affixed near its upper end to said shaft; and
  (d) a stationary mounting member coupled with the frame, said lower end of said support member being pivotably coupled with said mounting member at a main pivot axis whereby pivotal movement of said support member with respect to said mounting member effects movement of said upper end of said support member along an arcuate path which movement in turn, effects movement of said shaft, generally transversely to its axis, along the same arcuate path, such movement of said shaft being translated, via said support arm, into angular movement of said ramp to adjust the incline of said ramp with respect to said conveyor.

19. An apparatus as defined in claim 18, wherein said actuator is operatively coupled between said stationary mounting member and said support member, whereby actuation of said actuator moves said support member with respect to said mounting member to adjust the incline of said ramp with respect to the upper surface of the conveyor.

20. An apparatus as defined in claim 18 further including a movable lifting handle having an upper end and a lower end, said lifting handle being affixed adjacent its upper end with respect to said shaft such that movement of said lifting handle effects rotation of at least part of said shaft about its axis which, in turn, swings the entirety of said ramp via said support arm, away from the conveyor and out of the path of material being dewatered.

21. An apparatus as defined in claim 20 further including a locking mechanism on said mounting member, said locking mechanism being selectively engageable with said lifting handle to hold said lifting handle in a position which, in turn, holds said ramp in a raised position out of the path of the material to be dewatered.

22. An apparatus for use with a dewatering device of the type having a frame which carries a perforate conveyor with upstream and downstream ends, the conveyor also having an upper surface on which material being dewatered is deposited and through which conveyor water is drained, which apparatus is for enhancing the performance of the dewatering device, the apparatus for use with the dewatering device comprising:
  (a) a ramp for disposition adjacent the downstream end of the conveyor and for disposition at an incline with respect to the upper surface of said conveyor, said ramp receiving the material being dewatered and causing the material to roll back upon itself as the moving material tends to move up the ramp but partially falls back as a result of the incline, which rolling back action enhances dewatering; and
  (b) means coupled with said ramp for completely lifting said ramp out of the path of the material being dewatered during operation of the dewatering device.

23. An apparatus as defined in claim 22, wherein said lifting means includes a ramp support for supporting said ramp with respect to said frame, said ramp support including:
  (a) a shaft extending across the conveyor at a level above the material being dewatered, said shaft having an axis transverse to the direction in which material being dewatered moves along the conveyor;

(b) at least one support arm extending between said shaft and ramp, said support arm having an upper end adjacent to which said support arm is affixed to said shaft, said support arm also having a lower end adjacent to which said support arm is affixed to said ramp;

(c) at least one support member having upper and lower ends, said support member being affixed near its upper member to said shaft; and (d) a movable lifting handle having an upper end and a lower end, said lifting handle being affixed adjacent its upper end with respect to said shaft such that movement of said lifting handle effects rotation of at least part of said shaft about its axis which, in turn, swings the entirety of said ramp via said support arm, away from the conveyor and out of the path of material being dewatered.

24. An apparatus as defined in claim 22 further including means coupled with said ramp for adjusting the incline of said ramp with respect to the upper surface of said conveyor to optimize the rolling back action of the material being dewatered and to, in turn, provide optimum dewatering.

25. A method of dewatering sludge comprising the steps of:
(a) depositing the sludge on a moving perforate conveyor having an upper surface,
(b) advancing the sludge along the conveyor while water drains from the sludge through the perforate conveyor;
(c) interposing adjacent the downstream end of the conveyor a ramp, which is inclined with respect to the upper surface of the conveyor, into the path of the moving sludge so as to cause the sludge to roll back upon itself as the sludge tends to move up the ramp but partially falls back as a result of the incline, which rolling back action enhances dewatering; and (d) adjusting an actuator coupled with said ramp to, in turn, adjust the incline of the ramp with respect to the upper surface of the conveyor while the sludge is advancing on the conveyor in order to optimize dewatering.

26. A method as defined in claim 25 including the further step of completely lifting said ramp out of the path of the advancing sludge while the dewatering device is operating.

27. A method of dewatering sludge utilizing a dewatering device, the method comprising the steps of:
(a) depositing the sludge on a moving perforate conveyor;
(b) advancing the sludge along the conveyor while water drains from the sludge through the perforate conveyor;
(c) interposing adjacent the downstream end of the conveyor an inclined ramp into the path of the moving sludge so as to cause the sludge to roll back upon itself as the sludge tends to move up the ramp but partially falls back as a result of the incline, which rolling back action enhances dewatering; and
(d) completely lifting the ramp out of the path of the advancing sludge while the dewatering device is operating.

28. A method as defined in claim 27, including the step of cleaning the dewatering device, said cleaning step including said step of completely lifting the ramp.

29. A method as defined in claim 27, including the step of selectively eliminating enhanced dewatering in situations in which the enhanced dewatering provided by the ramp is not needed, said eliminating step including said step of completely lifting the ramp.

* * * * *